H. F. MANN.
Plow.
No. { 1,069, 32,073. }
Patented Apr. 16, 1861.
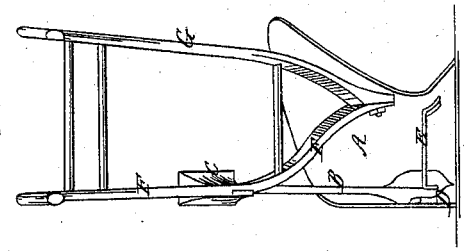
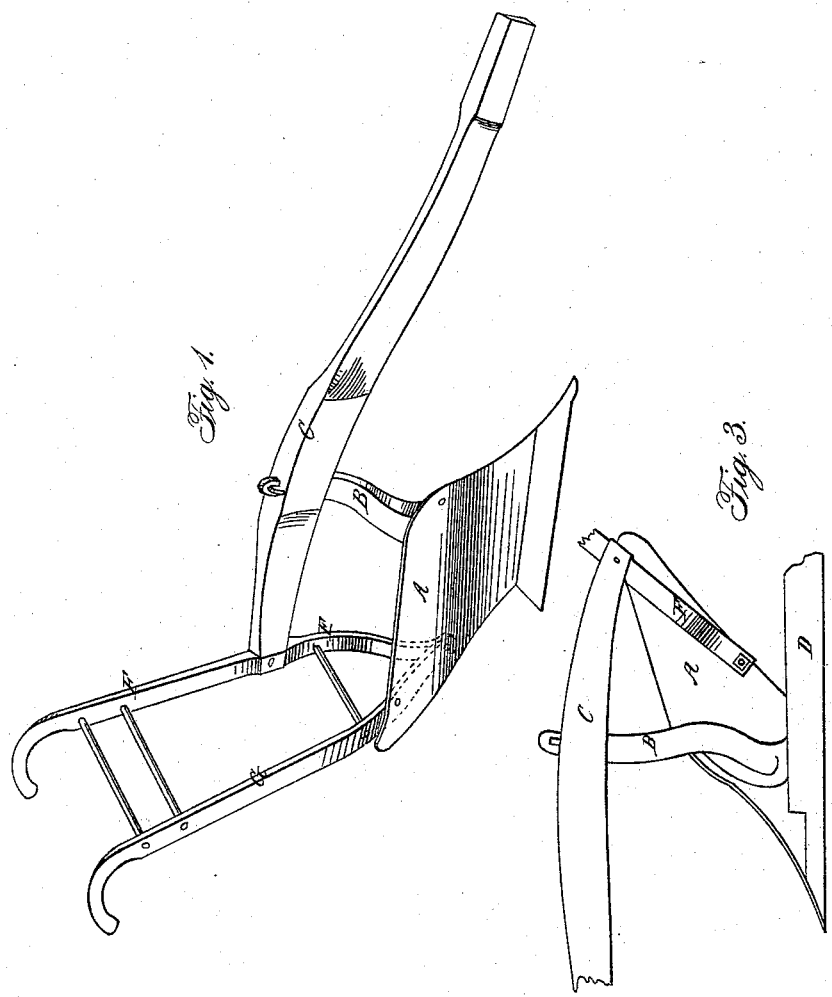
Witnesses:
Inventor:

UNITED STATES PATENT OFFICE.

HENRY F. MANN, OF LA PORTE, INDIANA.

IMPROVEMENT IN PLOWS.

Specification forming part of Letters Patent No. 32,073, dated April 16, 1861.

*To all whom it may concern:*

Be it known that I, HENRY F. MANN, of La Porte, in the county of La Porte and State of Indiana, have invented a new and useful agricultural improvement, which I call the "Patrician Plow;" and I do hereby declare that the following is a full, clear, and exact description of the same, reference being had to the accompanying drawings, forming a part of this specification, in which—

Figure 1 is a perspective view of my improved plow. Fig. 2 is a rear view of the same, and Fig. 3 is a land-side view.

Similar letters of reference in each of the several figures indicate corresponding parts.

The nature of my invention consists in so constructing and arranging the handles of the plow that while one of them joins to the rear end of the beam and the other to the under side of the mold-board the lower ends of both unite or come in such close proximity to each other that they may be fastened to the under side of the mold-board at their extremities.

The object of my invention is to firmly brace or stay the beam, mold-board, and standard of the plow, and at the same time to obviate the difficulty of clogging arising from attaching one of the handles to the landside-bar or to an arm projecting out from the rear of the standard. By attaching the handles in the manner I do a perfectly unobstructed space is secured behind the standard and between the beam and the landside-bar, and therefore there is no possible chance for the weeds, clods, &c., to hang and collect on that part of the landside-bar which is in rear of the standard.

To enable others skilled in the art to make and use my invention, I will proceed to describe its construction and operation.

A in the accompanying drawings represents the mold-board; B, the standard; C, the beam; D, the landside-bar, and E a transverse brace between the landside-bar and mold-board.

The landside-handle F passes down alongside the rear end of the beam, and is fastened to the same, and then takes a curved or bow form and extends over to near the under side of the mold-board. The other handle, C, is curved at its lower end so as to conform to the mold-board, and passes down alongside the inner surface of the mold-board until it meets the lower end of the landside-handle. The two lower ends are brought together and fastened to the mold-board by one and the same screw-bolt. Just above this bolt another bolt is passed through the handle G and the mold-board, so as to more securely fasten the handle G.

The lower ends of the handles might be attached to the mold-board by separate bolts. In this case the lower end of one handle should be set in advance of that of the other. I however prefer to have the lower ends of the handles confined by one and the same bolt, as shown in the drawings.

My plow is exceedingly simple and light, and yet strong and durable, and as it is what I term a "straight-draft" plow, it operates in the most perfect manner upon the soil.

What I claim as my invention, and desire to secure by Letters Patent, is—

Arranging the handles on the beam and mold-board of the plow substantially in the manner herein described, so that they act as stays or braces to the standard, beam, and mold-board, and at the same time offer no obstruction to the dirt, weeds, &c., in rear of the standard and above the landside-bar, as set forth.

H. F. MANN.

Witnesses:
  E. L. BENNET,
  WM. C. HANNAH.